United States Patent
Campbell

[11] Patent Number: 5,947,528
[45] Date of Patent: Sep. 7, 1999

[54] PIPE FLANGE ASSEMBLY

[76] Inventor: Robert W. Campbell, 124 Clara, Schriever, La. 70395

[21] Appl. No.: 08/759,272

[22] Filed: Dec. 2, 1996

[51] Int. Cl.$^6$ .................................................. F16L 55/00
[52] U.S. Cl. ................... 285/16; 285/55; 285/148.25; 285/336; 285/363; 285/416; 285/906
[58] Field of Search ................ 285/16, 148.23, 285/148.25, 148.26, FOR 159, 120, 55, 416, 336, 363, 906; 406/193

[56] References Cited

U.S. PATENT DOCUMENTS

| | | | |
|---|---|---|---|
| 954,549 | 4/1910 | Turner | 285/16 X |
| 1,601,093 | 9/1926 | Widmeyer | 285/16 |
| 2,072,893 | 3/1937 | Lee | 285/148.25 |
| 2,077,035 | 4/1937 | Bredeson | 285/55 |
| 2,144,227 | 1/1939 | Penick et al. | 285/336 X |
| 2,290,333 | 7/1942 | Johnson | 138/64 |
| 2,310,927 | 2/1943 | Bay | 138/64 |
| 2,332,787 | 10/1943 | Fleming | 285/55 X |
| 2,354,900 | 8/1944 | Wilkinson | 285/54 |
| 2,806,718 | 9/1957 | Cook et al. | 285/55 |
| 2,867,463 | 11/1959 | Snider | 285/336 X |
| 2,955,847 | 10/1960 | McKenna | 285/16 |
| 2,982,311 | 5/1961 | Haskell | 138/100 |
| 3,018,120 | 1/1962 | Vann | 285/55 |
| 3,228,096 | 1/1966 | Albro | 29/157 |
| 3,235,291 | 2/1966 | Jacoby | 285/55 |
| 3,284,107 | 11/1966 | West | 285/55 |
| 3,284,108 | 11/1966 | West | 285/55 |
| 4,277,091 | 7/1981 | Hunter | 285/55 |
| 4,336,958 | 6/1982 | Goetzinger | 285/55 |
| 4,691,740 | 9/1987 | Svetlik | 138/109 |
| 4,995,427 | 2/1991 | Berchem | 138/155 |
| 5,188,396 | 2/1993 | Calvin | 285/179 X |
| 5,271,427 | 12/1993 | Berchem | 406/193 |
| 5,338,070 | 8/1994 | Horikawa et al. | 285/148.23 |

FOREIGN PATENT DOCUMENTS

| | | | |
|---|---|---|---|
| 415260 | 3/1991 | European Pat. Off. | 285/FOR 159 |
| 653988 | 12/1937 | Germany | 285/FOR 120 |
| 5263979 | 10/1993 | Japan | 285/16 |

*Primary Examiner*—Dave W. Arola
*Attorney, Agent, or Firm*—David L. Ray

[57] ABSTRACT

An erosion resistant pipe flange assembly and a method for preventing erosion of metal pipe flanges connecting larger diameter pipe to smaller diameter pipe. The erosion resistant pipe flange assembly includes a flange section, a reducer section integrally formed with said flange section, and a replaceable liner for preventing erosion and abrasion of the interior of said pipe flange assembly.

8 Claims, 6 Drawing Sheets

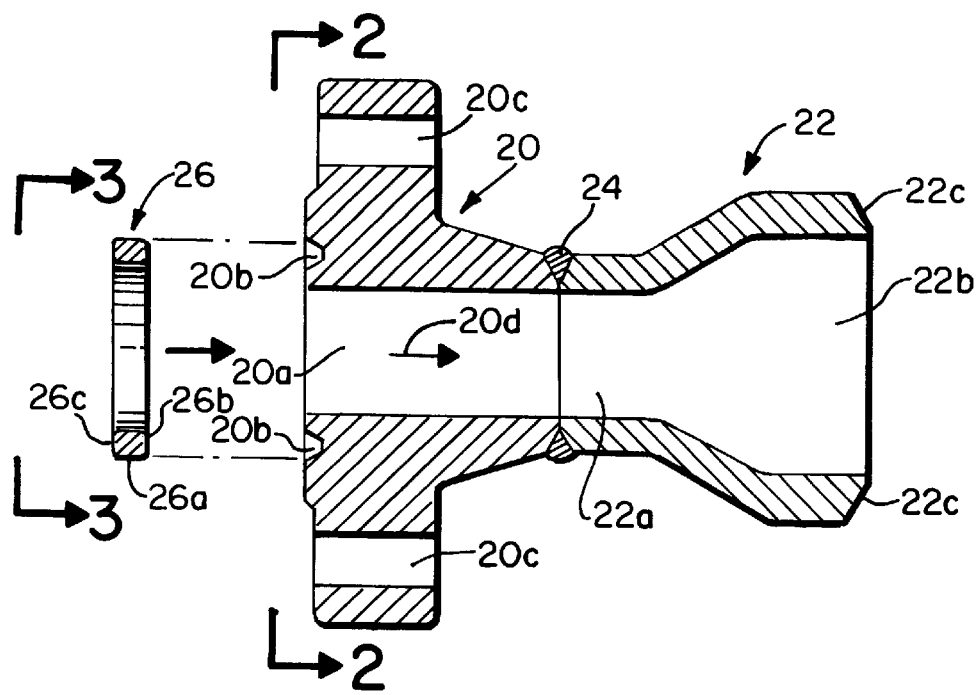
FIG. 1.
PRIOR ART
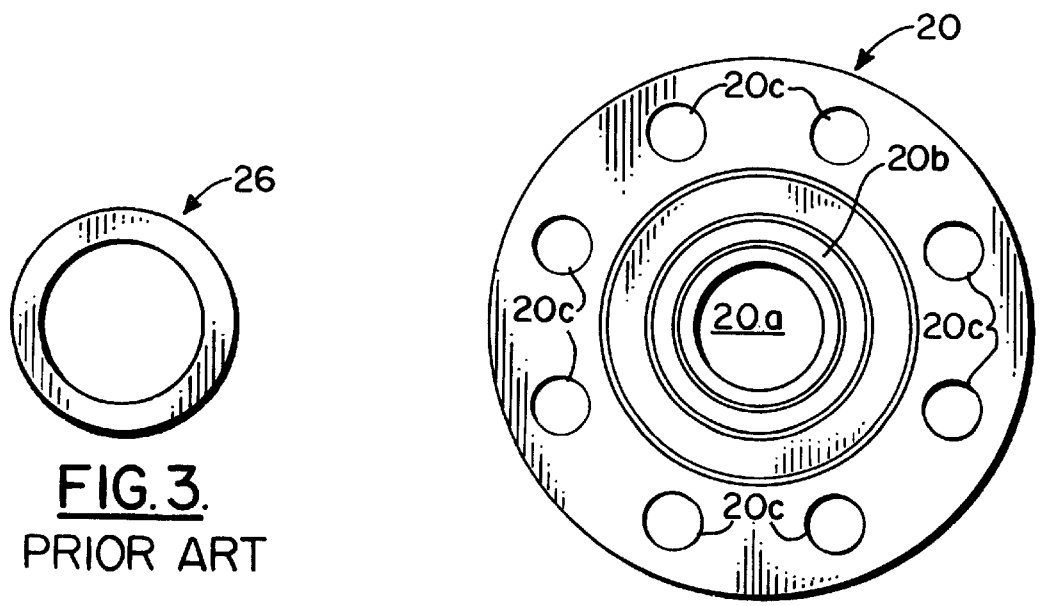
FIG. 3.
PRIOR ART
FIG. 2.
PRIOR ART

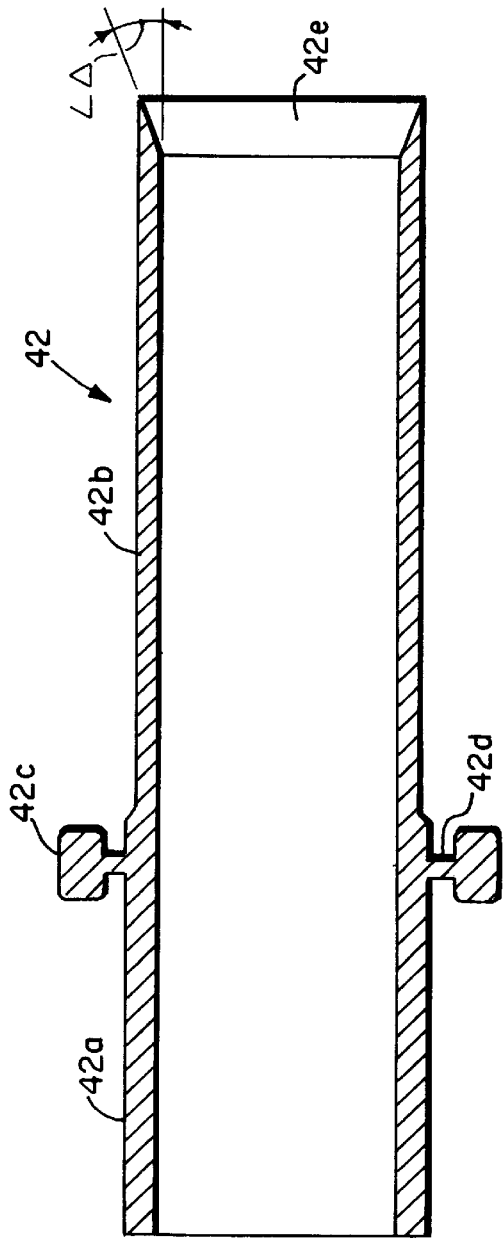
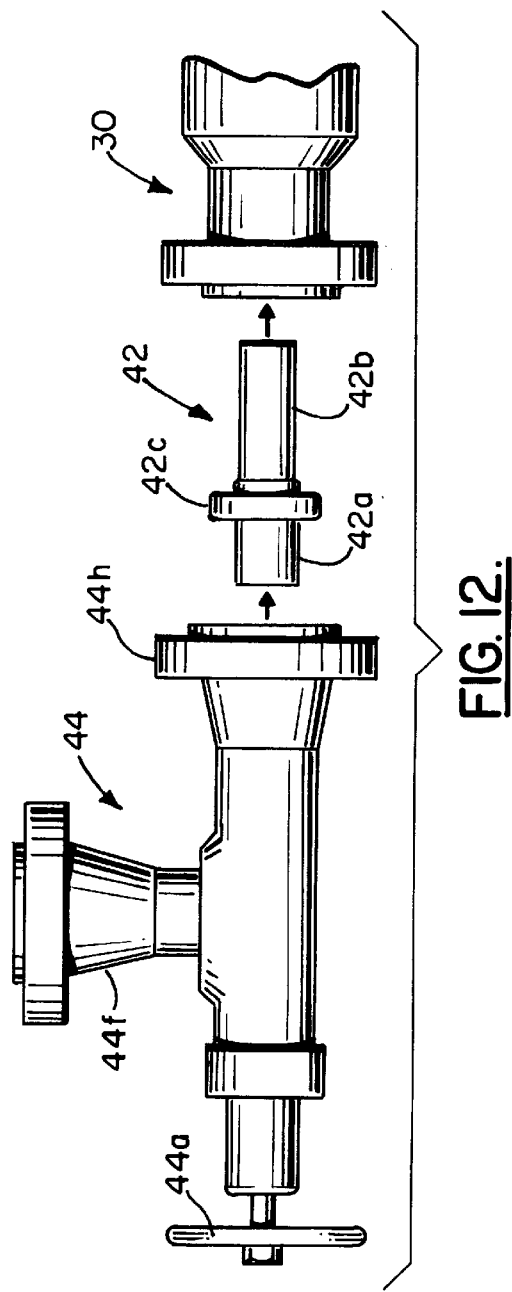

PIPE FLANGE ASSEMBLY

BACKGROUND OF THE INVENTION

1. Field of the Invention

The invention relates to pipe flanges. In particular, the invention relates to pipe flanges used in high pressure petroleum and natural gas production.

2. Description of the Related Art

Erosion and corrosion of the interior of high pressure steel pipe by the fluids flowing therethrough commonly occurs in the vicinity of the weld joint joining smaller diameter pipe to larger diameter pipe in which fluids are flowing from the smaller diameter pipe to the larger diameter pipe. The fluids flowing through such pipe may be under high pressures from 50 pounds per square inch to 10,000 pounds per square inch or more and have very high velocity flowing through the pipe and may have corrosive and abrasive elements therein. Such pressures are commonly encountered when natural gas, petroleum, and associated fluids are flowing out of deep gas and petroleum wells.

Such erosion requires constant monitoring and periodic replacement of welded metal pipe joints and flanges of such pipelines to prevent rupture of the pipeline due to erosion. Periodic replacement of welded pipe joints and flanges to prevent pipeline rupture due to erosion is expensive, sometime dangerous to personnel making the replacement, and commonly requires the interruption of flow through the pipeline. Rupture of such pipelines can cause serious injury or death of personnel in the area of the rupture, explosions, catastrophic damage to equipment, loss of expensive petroleum and gas, and serious pollution of the environment.

Elimination or reduction of the erosion of such pipe joints and flanges in high pressure pipelines is therefore highly desirable.

Exemplary of the Patents of the related art are the following U.S. Pat. Nos.: 2,290,333; 2,310,927; 2,354,900; 2,806,718; 2,982,311; 3,018,120; 3,228,096; 3,235,291; 3,284,107; 3,284,108; 4,277,091; 4,691,740 and 4,995,427.

SUMMARY OF THE INVENTION

In accordance with the present invention there is provided an erosion resistant pipe flange assembly and a method for preventing erosion of metal pipe flanges connecting larger diameter pipe to smaller diameter pipe. The pipe flange assembly includes a flange section, a reducer section integrally formed with the flange section, and a replaceable liner for preventing erosion of the interior of the pipe flange assembly.

The invention has the advantage of greatly reducing and/or eliminating the erosion of pipe joints and flanges by high pressure fluids flowing therein.

The invention has the additional advantage of reducing or eliminating dangerous ruptures and explosions in flange and reducer assemblies of the prior art.

BRIEF DESCRIPTION OF THE DRAWINGS

FIG. 1 is a cross-sectional, side view of a prior art flange and ring assembly having a weld neck reducer welded thereto;

FIG. 2 is a plan view of the flange shown in FIG. 1 taken along line 2—2 of FIG. 1;

FIG. 3 is a plan view of the ring shown in FIG. 1 taken along line 3—3 of FIG. 1;

FIG. 11 is a side view of a third embodiment of the liner of the invention for insertion in a choke assembly and in the flange of the invention;

FIG. 12 is a side view of a third embodiment of the liner of the invention aligned for insertion in a choke assembly and in the flange of the invention.

DESCRIPTION OF THE PREFERRED EMBODIMENTS

Figure 4:
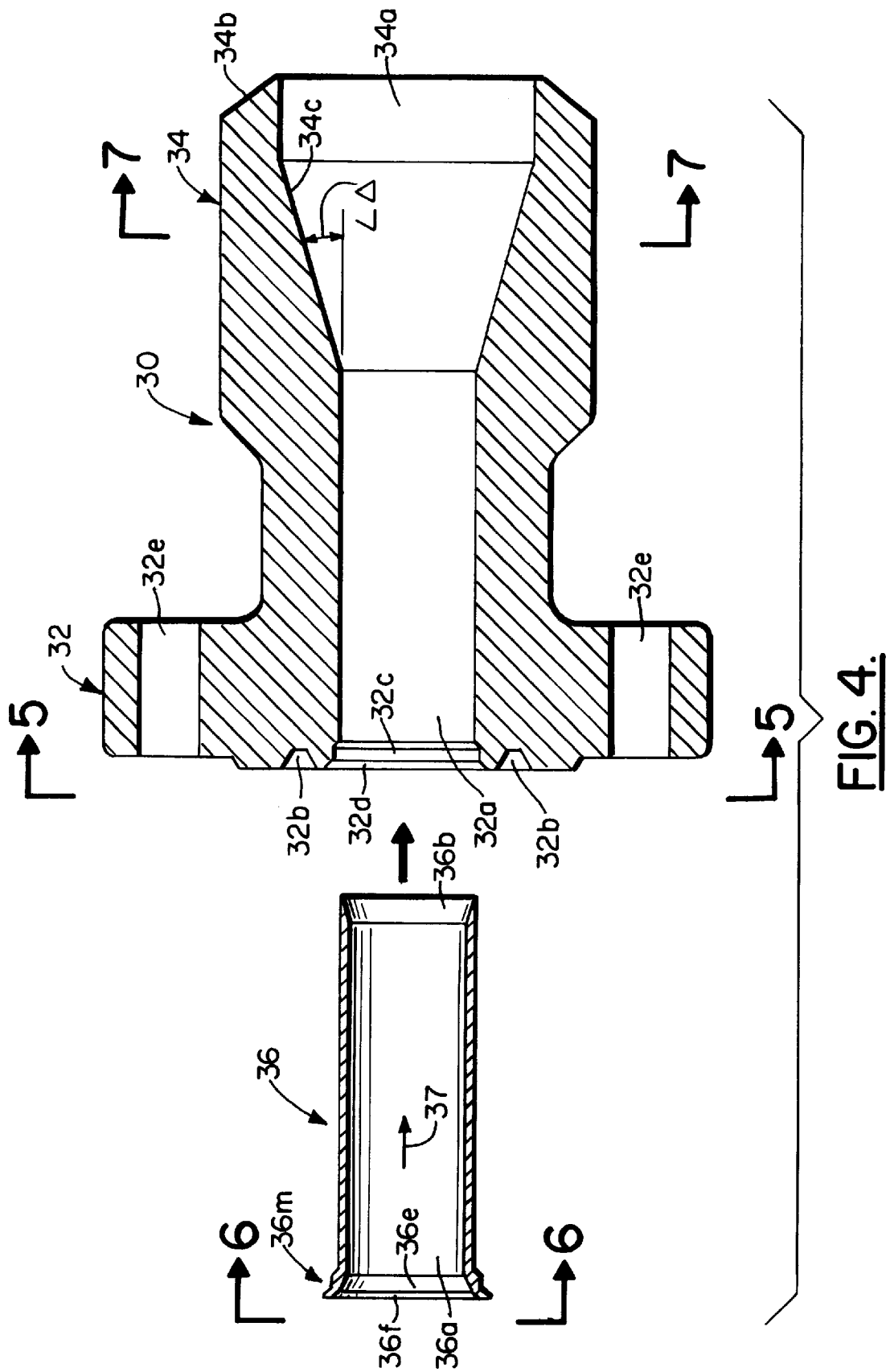
FIG. 4 is a cross-sectional, side view of the flange and liner of the invention.
Figure 5:
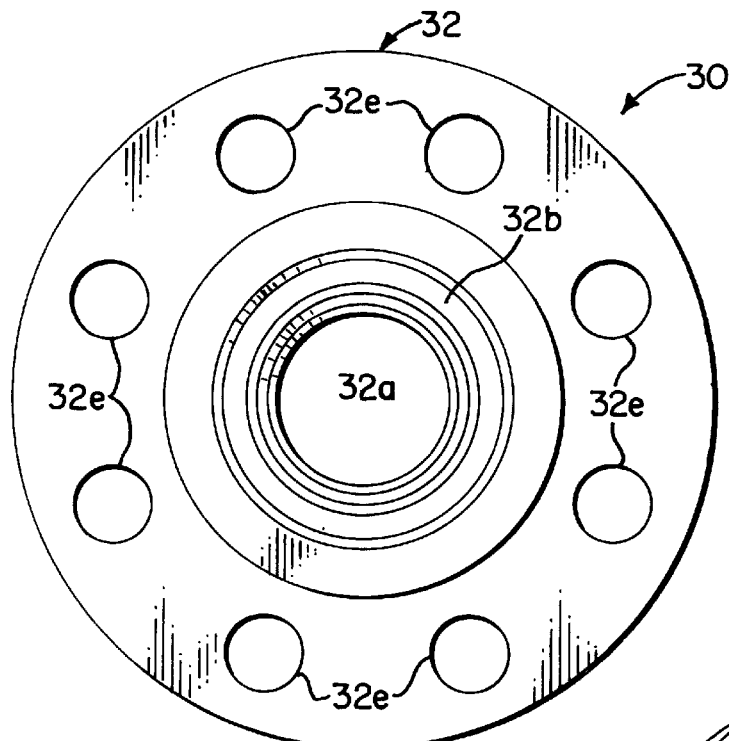
FIG. 5 is a plan view of the flange shown in FIG. 4 taken along line 5—5 of FIG. 4.
Figure 6:
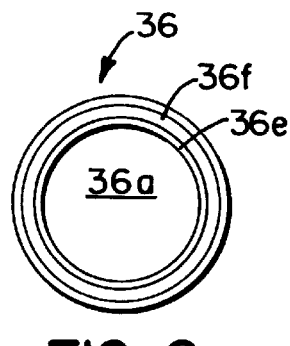
FIG. 6 is a plan view of the liner shown in FIG. 4 taken along line 6—6 of FIG. 4.
Figure 7:
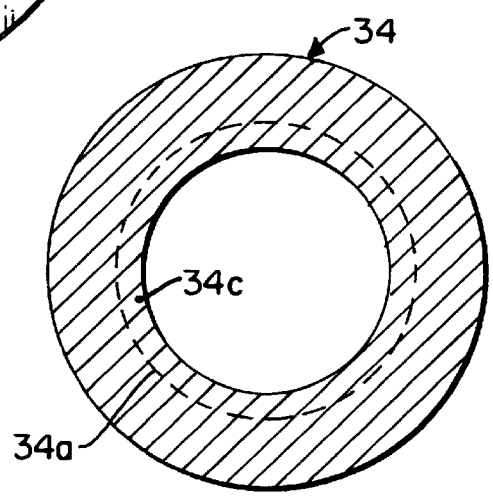
FIG. 7 is a cross-sectional, plan view of the flange shown in FIG. 4 taken along line 7—7 of FIG. 4.

FIGS. 1–3 illustrate the conventional procedure used in the art for connecting small diameter metal pipe such as steel pipe to larger diameter metal pipe. Referring now to FIGS. 1–3, a prior art metal pipe flange is generally indicated by the numeral 20. Pipe flange 20 has a central cylindrical bore 20a through which fluids under superatmospheric pressure flow.

A prior metal art weld neck reducer generally indicated by the numeral 22 is welded to pipe flange 20 by weld 24. Weld neck reducer 22 has a central cylindrical bore 22a axially aligned with a larger central cylindrical bore 22b. The diameter of central bore 22a is identical to the diameter of central bore 20a of flange 20. Pipe (not shown) having a central bore diameter identical to the central cylindrical bore diameter 22b of weld neck reducer 22 may then be welded to the end 22c of weld neck reducer 22.

A circular ring generally indicated by the numeral 26 is aligned for placement in circular tapered groove 20b to function as a seal when a second flange (not shown) identical to flange 20 is bolted to pipe flange 20 by bolts (not shown) placed in cylindrical bolt holes 20c of flange 20. Thus, small pipe (not shown), such as two-inch steel line pipe, connected to flange 20 can be connected to larger diameter pipe (not shown), such as four-inch steel line pipe, by welding the larger pipe to the end 22c of weld neck reducer 22. Two-inch and four-inch steel line pipe referred to herein refers to the nominal size of the pipe as is known to those skilled in the art, not to the inside or outside diameter of the pipe.

Circular ring 26 is a hollow cylinder 26a having two flat faces 26b and 26c. Flat face 26b is received in groove 20b and is deformed when a second flange (not shown) is bolted to flange 20 as mentioned above. Circular ring 26 is deformed to assume the shape of groove 20b when the bolts (not shown) connecting flange 20 to the second flange (not shown) are tightened with sufficient torque to force the two flanges into contact with each other. Thus, circular ring 26 forms a high pressure seal between flange 20 and the second flange (not shown) is bolted thereto.

In common practice, a small diameter metal pipe, such as a two-inch steel line pipe, conveys high pressure fluids such as gas and/or petroleum, to flange 20. The fluids flow through bore 20a in flange 20 in the direction indicated by the arrow 20d and onward through bore 22b of weld neck reducer 22 to a larger diameter metal pipe (not shown) welded to the end 22c of weld neck reducer 22.

Erosion of the interior walls of bore 20a of flange 20 and the interior walls of bore 22a of weld neck reducer 22 by the fluids flowing therethrough commonly occurs in the vicinity of weld 24. The fluids flowing through flange 20 and weld neck reducer 22 may be under pressures from 2,000 pounds per square inch to 10,000 pounds per square inch and have very high velocity flowing through the pipe. Petroleum and gas fluids commonly contain particles of sand therein which are abrasive and accelerate the rate of erosion in the vicinity of weld 24.

Referring now to FIGS. 4–9, the present invention can be seen to include a metal flange assembly generally indicated by the numeral 30 having a flange section generally indicated by the numeral 32 and a reducer section generally indicated by the numeral 34. Flange assembly 30 is preferably integrally formed from a single piece of high-strength, corrosion and abrasion resistant steel alloy and meets or exceeds API (American Petroleum Institute) standards for strength and dimensions.

Flange section 32 has a central cylindrical bore 32a. Reducer section 34 has a central cylindrical bore 34a axially aligned with cylindrical bore 32a and having a larger diameter than central cylindrical bore 32a. Central cylindrical bore 32a is joined to central cylindrical bore 34a by a tapered or beveled section 34c. Metal pipe such as steel pipe (not shown) having a central bore diameter identical to the central cylindrical bore diameter 34a of reducer section 34 may then be welded to the end 34b of reducer section 34.

As shown in FIGS. 4, 6, 8, and 9, flange assembly 30 has a replaceable metal liner generally indicated by the numeral 36 which is received in central cylindrical bore 32a. Preferably, flange liner 36 is slidably received in said central cylindrical bore 32a and fits snugly therein. Flange liner 36 has a central cylindrical bore 36a through which fluids flow in the direction indicated by the arrow 37 shown in FIGS. 4, 8, and 9. Preferably, flange liner 36 has an interior beveled portion 36b forming an angle Δ which is aligned with the beveled portion 34c of reducer section 34 to decrease turbulence at the downstream end of flange liner 36. Liner 36 is preferably integrally formed from a single piece of high-strength, corrosion and abrasion resistant steel alloy and meets or exceeds API (American Petroleum Institute) standards for strength and dimensions.

Figure 8:
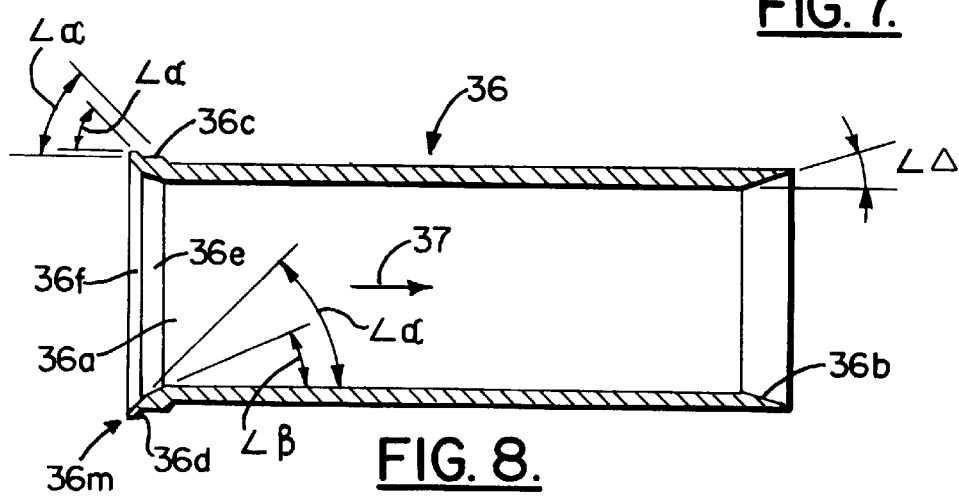
FIG. 8 is an enlarged, detailed view of the liner shown in FIG. 4.

Liner 36 also preferably has a lip section 36m at the upstream end thereof including two lips 36c and 36d shown in FIG. 8 at the upstream end thereof for seating liner 36 in grooves 32c and 32d, respectively, of flange section 32 shown in FIG. 4. Lips 36c and 36d have outside edges which preferably form an angle α with the outside surface of liner 36. Liner 36 also has two inside bevels 36e and 36f. Bevel 36e preferably forms an angle β with the inside surface of liner 36, and bevel 36f preferably forms an angle α with the outside surface of liner 36. Preferably angle α is 45°, angle β is 22.5°, and angle Δ is 15°. If desired, different bevel angles may be utilized, or a single bevel or arc could be utilized in the upstream end of liner 36 to reduce turbulence in the fluids flowing in the vicinity of the upstream end of liner 36.

Liner 36 has a length sufficient to completely enclose and protect the entire length of central cylindrical bore 32a from erosion by fluids and sand particles which may flow therethrough. Liner 36 is made from erosion and abrasion resistant metal alloy. Liner 36 is preferably replaced periodically as liner 36 is eroded and/or abraded by the fluids and sand particles flowing therethrough prior to liner 36 being punctured or ruptured due to erosion and/or abrasion. Periodic replacement of liner 36 prior to rupture of liner 36 prevents erosion of central cylindrical bore 32a of flange assembly 30. The resultant prevention of the erosion of central bore 32a greatly extends the life of flange assembly 30 and prevents dangerous ruptures and explosions which have occurred in flange and reducer assemblies of the prior art such as the prior art flange and weld neck reducer assemblies shown in FIGS. 1–3.

Figure 9:
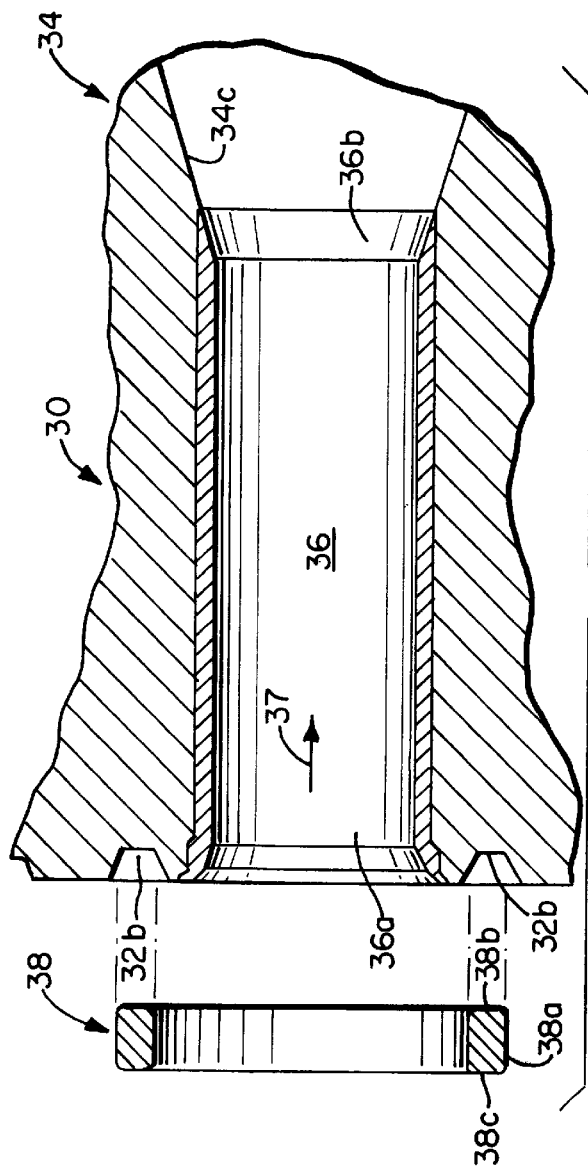
FIG. 9 is a partly cut-away, enlarged, detailed view of a portion of the flange shown in FIG. 4 with the liner seated therein and a ring aligned for placement in the flange.

A circular ring generally indicated by the numeral 38 in FIG. 9 is aligned for placement in circular tapered groove 32b to function as a seal when a second flange (not shown) identical to flange 20 shown in FIG. 1 is bolted to flange section 32 of flange assembly 30 by bolts (not shown) placed in cylindrical bolt holes 32e of flange section 32. Thus, small pipe (not shown), such as pipe two-inch steel line pipe, connected to flange section 32 by a flange identical to flange 20, can be connected to larger diameter pipe (not shown), such four-inch steel line pipe, by welding the larger pipe to the end 34b of reducer section 34.

Circular ring 38 is identical to ring 26 shown in FIG. 1 and is a hollow cylinder 38a having two-flat faces 38b and 38c. Flat face 38b is received in groove 32b and is deformed when a second flange (not shown) identical to flange 20 is bolted to flange assembly 30 as mentioned above. Circular ring 38 is deformed to assume the shape of groove 32b when the bolts (not shown) connecting flange assembly 30 to the second flange (not shown) identical to flange 20 is tightened with sufficient torque to force the two flanges into contact with each other. Thus, circular ring 38 forms a high pressure seal between flange assembly 30 and the second flange (not shown) identical to flange 20 bolted thereto.

Figure 10:
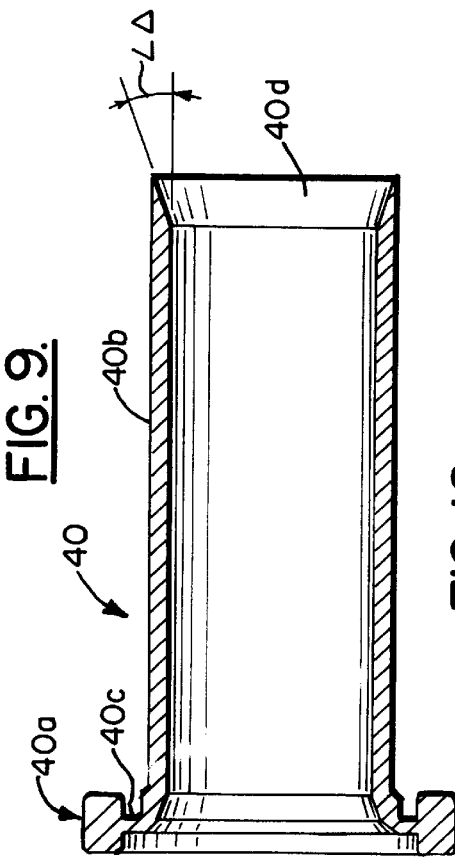
FIG. 10 is a cross-sectional, enlarged, detailed view of a second embodiment of the liner of the invention having a ring connected thereto.

In FIG. 10 is shown a second embodiment of the flange liner of the invention generally indicated by the numeral 40. Flange liner 40 has ring 40a integrally formed with hollow cylindrical liner body 40b and connected to liner body 40b by rib 40c, and is otherwise identical to liner 36. Ring 40a is identical in shape to ring 38 shown in FIG. 9, and is received in groove 32b of flange assembly 30 when liner 40 is substituted for ring 38 and liner 36 in flange assembly 30. Ring 40a deforms in the same manner as ring 38 when a second flange (not shown) identical to flange 20 is bolted to flange assembly 30. Preferably, flange liner 40 has an interior beveled portion 40d having an angle Δ which is aligned with the beveled portion 34c of reducer section 34 to decrease turbulence at the downstream end of flange liner 40.

Figure 13:
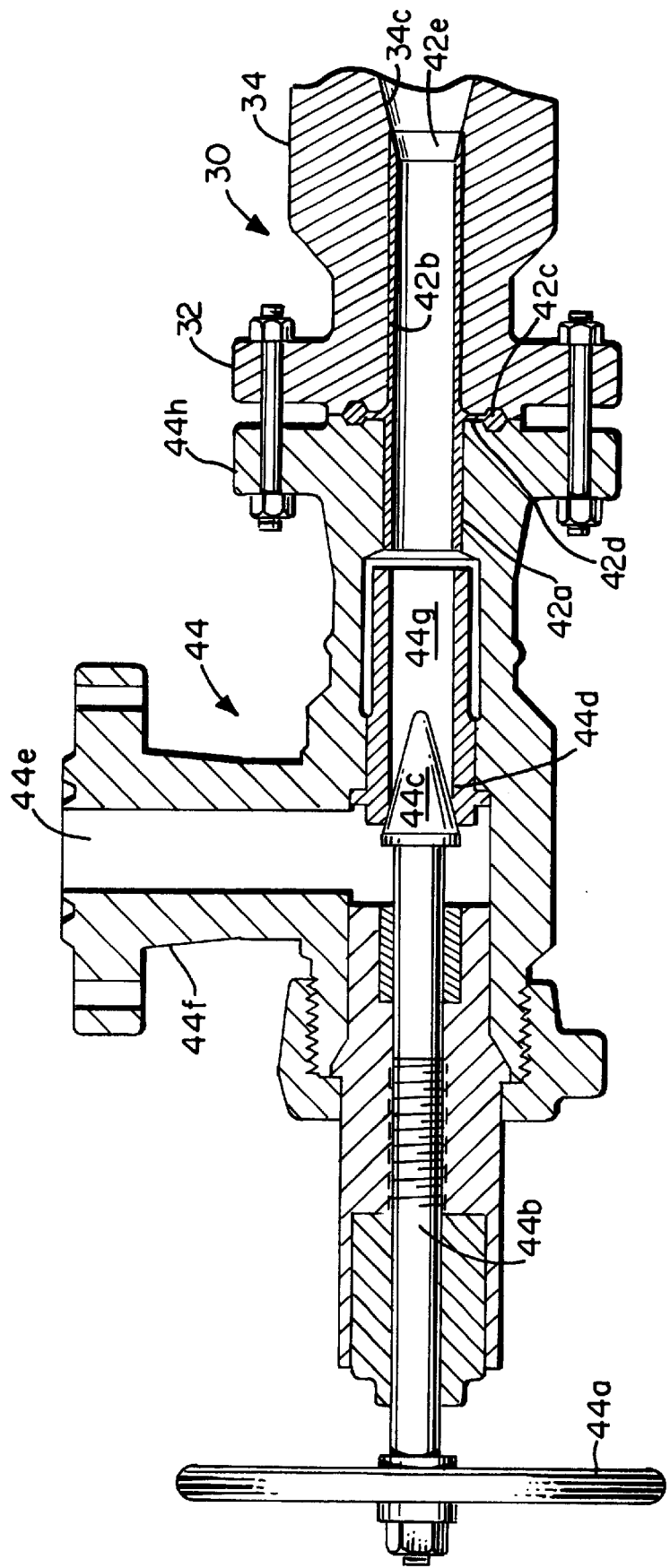
FIG. 13 is a side, partly cross-sectional view of the third embodiment of the liner of the invention inserted and seated in the choke assembly shown in FIG. 11 and the flange of the invention with the choke assembly being bolted to the flange of the invention.

In FIGS. 11–13 is shown a third embodiment of the liner of the invention generally indicated by the numeral 42. Liner 42 is used to connect a conventional choke assembly generally indicated by the numeral 44 to the flange assembly 30 of the present invention. Liner 42 is similar to liner 40 having an additional hollow cylindrical section 42a integrally formed therewith for receipt in the discharge flange 44a of choke 44. Hollow cylindrical section 42a is preferably slidably received in discharge flange 44a and is snugly received therein. Liner 42 has a ring 42c connected to hollow cylindrical section 42a and 42b by circular rib 42d. Ring 42c is identical in shape to ring 38 shown in FIG. 9, and is received in groove 32b of flange assembly 30 when liner 42 is placed in flange assembly 30 as shown in FIG. 13. Ring 42c deforms in the same manner as ring 38 when flange 44h of choke 44 is bolted to flange assembly 30. Preferably, flange liner 42 has an interior beveled portion 42e having an angle Δ which is aligned with the beveled portion 34c of reducer section 34 to decrease turbulence at the downstream end of flange liner 42.

Choke assembly 44 is a conventional choke assembly well known in the art. As known to those skilled in the art, choke assembly 44 has a circular handle 44a connected to a rotatable threaded shaft 44b having a cone 44c on the end thereof which fits against seat 44d. As shown in FIG. 13, cone 44c is seated against seat 44d, preventing flow therethrough. When handle 44a is rotated to turn shaft 44b and withdraw cone 44c away from seat 44d, fluids can flow through hollow cylindrical passage 44e in flange 44f around cone 44c and into hollow cylindrical passage 44g in flange 44h. From passage 44f fluids flow into hollow cylindrical section 42a, hollow cylindrical section 42b, and outward through beveled portion 42e.

An additional flange (not shown) may be bolted to flange 44a of choke 44 to supply fluids such as petroleum and gas thereto. Flange assembly 30 of the invention is shown bolted in FIG. 13 to flange 44h of the discharge end of choke 44. Liner 42 prevents erosion of the hollow cylindrical portion of flange 44a covered by hollow cylindrical section 42a of liner 42, and liner 42 prevents erosion of the portion of flange assembly 30 of the invention covered by hollow cylindrical portion 42b of liner 42.

The present invention thus greatly reduces and/or sometimes eliminates the erosion of pipe joints and flanges by high pressure fluids flowing therein. All of the liners 36, 40 and 42 are preferably replaced periodically as the liners 36, 40, and 42 are eroded and/or abraded by the fluids and sand particles flowing therethrough prior to the liners being punctured or ruptured due to erosion and/or abrasion. Periodic replacement of liners 36, 40, and 42 prior to rupture thereof prevents erosion of central cylindrical bore 32a of flange assembly 30, and periodic replacement of liner 42 also prevents the discharge port in the discharge flange of the choke from eroding. The resultant prevention of the erosion of central bore 32a greatly extends the life of flange assembly 30 and prevents dangerous ruptures and explosions which have occurred in flange and reducer assemblies of the prior art such as the prior art flange and weld neck reducer assemblies shown in FIGS. 1–3.

All of the liners 36, 40 and 42 are preferably integrally formed from a single piece of high-strength, corrosion and abrasion resistant steel alloy and meet or exceed API (American Petroleum Institute) standards for strength and dimensions. Preferably all of the liners 36, 40 and 42 are slidably received in said central cylindrical bore 32a and fit snugly therein.

Therefore, erosion of flange assembly 30 can be prevented by the method of periodically disconnecting the flange assembly 30 in which an old, abraded or eroded liner 36, 40, or 42 is located from the adjacent conventional flange connected to flange assembly 30, sliding the old liner 36, 40, or 42 out of flange assembly 30, placing a new liner 36, 40, or 42 in flange assembly 30, and reconnecting flange assembly 30 containing the new liner 36, 40, or 42 to the adjacent flange. The time interval or period of replacement of liners 36, 40, or 42 will be determined by the rate of flow, pressure, and abrasive nature of the fluids flowing therethrough, and by observing the rate of erosion and/or abrasion of the liners 36, 40, and 42 in the field or area where the liners 36, 40, and 42 and flange assemblies 30 are utilized.

Preferably flange assembly 30 is machined or formed from a solid piece of steel. However, flange assembly 30 could be formed from a reducer section being welded or otherwise bonded to a flange section, with the liner 36, 40, or 42 being placed therein.

Although the preferred embodiments of the invention have been described in detail above, it should be understood that the invention is in no sense limited thereby, and its scope is to be determined by that of the following claims:

What is claimed is:

1. An erosion and abrasion resistant metal pipe flange assembly having a flange at the upstream end thereof connectable to a conventional metal pipe flange and a beveled downstream end for welding metal pipe thereto, the pipe flange assembly being used in containing and conveying high pressure fluids flowing from a smaller diameter pipe to a larger diameter pipe, said pipe flange assembly comprising:

a. a metal flange section having a central cylindrical bore therein extending completely through said flange section, said central cylindrical bore having a groove adjacent to the upstream end thereof, said metal flange section having a flange integrally formed therewith at one end thereof for connecting said metal flange section to a conventional metal pipe flange, and b. a metal reducer section integrally formed with said flange section, said metal reducer section having a central cylindrical bore therein which is larger in diameter than said central cylindrical bore of said flange section, said metal reducer section having the outer surface of the end thereof adjacent to said cylindrical bore of said metal reducer section beveled for welding a pipe thereto, said central cylindrical bore of said flange section being joined to said central cylindrical bore of said reducer section by a beveled section, and c. a replaceable hollow metal cylindrical liner for preventing erosion and abrasion of the interior of said pipe flange assembly, said liner having two ends and a lip section at one end thereof adapted for seating in said groove contained in said flange section, said lip section extending completely around said one end of said liner, said liner being slidably received in said central cylindrical bore of said flange section and slidably removable from said central bore of said flange section when said liner becomes eroded and abraded.

2. The pipe flange assembly of claim 1 wherein a cylindrical deformable ring is connected to the outer periphery of said lip section.

3. The pipe flange assembly of claim 1 wherein said liner has a deformable ring connected to the outside of said hollow cylinder between said two ends of said liner.

4. The pipe flange assembly of claim 1 wherein said liner has a beveled portion in the other end thereof for reducing the turbulence of fluids flowing therethrough.

5. The pipe flange assembly of claim 1 wherein said reducer section has a central, cylindrical bore therein which communicates with said central cylindrical bore of said flange section.

6. The pipe flange assembly of claim 1 wherein said central cylindrical bore of said reducer section is axially aligned with said central cylindrical bore of said flange section.

7. The pipe flange assembly of claim 1 wherein said flange section has a circular groove therein for receipt of a hollow, cylindrical sealing ring.

8. The pipe flange assembly of claim 1 wherein said liner is made from a corrosion and abrasion resistant steel alloy.

* * * * *